United States Patent Office 3,424,626
Patented Jan. 28, 1969

3,424,626
LOW SILICA WELDING COMPOSITION
Thomas L. Coless, Maplewood, and Kenneth Woodrow Rimer, Newark, N.J., assignors to Union Carbide Corporation, a corporation of New York
No Drawing. Filed Jan. 5, 1965, Ser. No. 423,600
U.S. Cl. 148—26       14 Claims
Int. Cl. B23k 35/36

This invention relates to a welding composition for electric arc welding and, more particularly, to a fused welding composition for submerged arc welding.

Submerged arc welding is a process wherein a welding composition and a consumable metal electrode through which an electric welding current is flowing melt within the confines of a welding joint. The composition forms a slag over the fused metal of the electrode, protecting and molding it to a desired shape. This type of welding is disclosed by Jones et al. in Patent No. 2,043,960.

Submerged arc welding compositions in general use contain oxygen-bearing compounds which, during welding, oxidize some of the alloying elements in the weld puddle. Silica, or silicon dioxide, which is present in substantial amounts in most commercial compositions, is largely responsible for this effect although other oxides such as manganese and iron oxide are also involved. In addition to alloy losses, appreciable amounts of silicon can be transferred to the deposited metal by reduction of the silicon oxide with some of the alloying elements used in the welding wire and base metal. These changes are generally of small consequence in carbon steel welding, but become important when welding alloy steels or nickel and its alloys.

Nickel-base alloys such as Inconel and Monel (nominal composition given hereinafter), as well as maraging steels and 9 percent nickel steel, are being used increasingly in welded components and structures. Maraging is a term denoting the type of aging process used to develop high tensile strength in steels such as 18 percent and 24 percent nickel steels. Joining these materials by the submerged arc process has never been widely practiced because of the high losses of oxidizable elements in the weld puddle resulting in low quality welds which are quite different chemically from the base metal. Other detrimental effects, such as cracks and fissures, result from the increased silicon content of the weld metal produced with conventional submerged arc welding compositions.

A typical Inconel contains nominally about 70% nickel and 15% chromium, the balance being materials such as iron, manganese, copper, etc.

Monel nominally is about 70% nickel and 30% copper with other minor constituents such as titanium.

Accordingly, it is an object of this invention to provide a fused welding composition for welding materials such as Inconel, Monel, maraging steels, and 9 percent nickel steel wherein silicon transfer from the composition to the weld deposit is negligible.

Another object is to provide a composition which can be used in cladding such steels.

Yet another object is to provide a composition having excellent weldability and good slag removal.

A further object is to provide a composition which produces a highly conductive slag.

A still further object is to provide a composition for submerged arc welding materials such as Monel, Inconel, maraging steels and 9 percent nickel steels whereby the physical properties of the weld fall within published specifications.

The objects of the invention are achieved, in general, by a fused welding composition consisting essentially of from about 30 percent by weight up to about 65 percent by weight of at least one oxide taken from the class consisting of $Al_2O_3$, MgO, $TiO_2$, $ZrO_2$ and CaO and the balance being a fluorine-bearing compound taken from the class consisting of calcium fluoride, sodium fluoride, magnesium fluoride, lithium fluoride, potassium fluoride and cryolite; said composition being substantially free of silica.

Submerged arc welding compositions are formulated from various metal oxides combined with fluoride-bearing compounds. Silicon dioxide is usually compounded in appreciable quantities in most commercial welding compositions because it imparts good weldability characteristics and is a relatively low cost material. It is usually present in proportions of around 40 percent by weight but, depending on the slag system incorporated, the silicon dioxide level may vary from 20 to 80 percent—in some cases. Silicon dioxide is most generally introduced into the composition by means of mineral compounds which contain large amounts of other metal oxides, but it is also often added in the form of silica sand. Examples of these combined sources of mineral compounds are bentonite, an aluminum silicate; wollastonite, a calcium silicate; talc, a magnesium silicate; zircon, a zirconium silicate; and various manganese ores.

Up until now silicon dioxide has been considered necessary in the formulation of submerged arc compositions. Silica provides the necessary physical and electrical properties to the composition. It forms eutectic compounds with the remaining components of the welding composition to allow solidification to occur at a temperature slightly lower than the melting point of steel. This provides full protection to the weld puddle from atmospheric oxidation. It is well known that the submerged arc welding process is considerably more stable if the silica content of the composition is high.

Fluoride compounds are usually added to submerged arc welding compositions to lower the viscosity of the composition. This produces a smoother and more uniform bead. The fluoride compounds do not enter significantly into the oxidation-reduction reaction with the alloying elements in the puddle, but they do contribute to arc stability. There is also evidence that the molten fluorides extract hydrogen from moisture. This reaction reduces the amount of hydrogen in the weld, thus decreasing the porosity. Fluoride compounds are, therefore, considered an essential ingredient of all submerged arc welding compositions.

It is a relatively simple matter to select minerals containing virtually no silica. Selecting a low silica oxide system which has desirable welding characteristics, however, is an entirely different matter. Certain oxide systems are incapable of producing a continuous uniform bead because they do not produce a stable arc. By careful selection and balancing of various oxides, however, it has been possible to produce useful compositions containing practically no silica and having desirable welding characteristics. These compositions transfer to the weld the least amount of silicon of any conventional commercial submerged arc welding composition.

Examples of compositions made according to the teachings of the invention are given below:

TABLE I

| Material | Composition, percent by weight | | |
|---|---|---|---|
| | A | B | C |
| $Al_2O_3$ | | 35.0 | 28.0 |
| $TiO_2$ | 27.00 | 26.0 | 25.0 |
| MgO | 4.00 | | |
| CaO | 2.00 | | |
| $ZrO_2$ | 4.00 | | |
| Mn ore ($MnO, MnO_2$) | 21.00 | | 5.0 |
| $SiO_2$ | 1.0 | | 0.0 |
| $CaF_2$ | 32.00 | 37.0 | 35.0 |
| $Na_3AlF_6$ (cryolite) | 9.00 | | 4.0 |
| Potassium compounds | | 2.0 | 3.0 |

The above table lists preferred percentages for the ingredients in each composition. The percentages of each ingredient may be varied with the ranges given herein below for each of compositions A, B and C.

TABLE II

|  | A | B | C |
|---|---|---|---|
| $Al_2O_3$ | 0.0– 5.0 | 5.0–40.0 | 5.0–40.0 |
| $TiO_2$ | 25.0–35.0 | 5.0–40.0 | 5.0–40.0 |
| MgO | 1.0–10.0 |  |  |
| CaO | 1.0– 5.0 |  |  |
| $ZrO_2$ | 1.0–10.0 |  |  |
| Mn ore | 10.0–30.0 | 0.0– 2.0 | 1.0–20.0 |
| $SiO_2$ | 0.0– 3.0 | 0.0– 3.0 | 0.0– 3.0 |
| $CaF_2$ | 20.0–40.0 | 20.0–70.0 | 20.0–40.0 |
| $Na_3AlF_6$ | 1.0–20.0 | 0.0– 5.0 | 1.0–20.0 |
| Potassium compounds |  | 0.0– 5.0 | 0.0– 5.0 |

The compositions are made in the conventional manner by dry blending the ingredients and then charging them into a metallurgical furnace. The ingredients are fused in the furnace. The molten mixture is then cast onto chills for solidification. The solidified mass is crushed to size and is then ready to use.

Composition A, above, is a high fluoride manganese titanate composition useful for applications where retention of manganese in the weld metal is desirable. Since the composition contains mostly oxides which are more stable than manganese oxide, the alloying element manganese is retained more fully in the submerged arc weld puddle and manganese pickup from the puddle can occur.

Composition A has been used to produce sound, X-ray quality welds in 1 in. thick Monel plate. The joint design was a double V with the opening being 75 degs. on one side and 70 degs. on the other side. The welding wire used was a 5/32 in. diameter nickel alloy wire consisting essentially of about 70% Ni, 30% Cu. The weld was made in three passes: Pass 1 at 28 volts, 580 amperes D.C.R.P. and 22 i.p.m. travel speed; Pass 2 at 29 volts, 600 amperes D.C.R.P., 18 i.p.m. travel speed; and Pass 3 at 30 volts, 600 amperes D.C.R.P., 18 i.p.m. travel speed. Mechanical properties of the weld were: ultimate tensile—70,100 p.s.i.; yield strength—33,700 p.s.i.; elongation—45.1 percent, and reduction in area—72.8.

Composition A has also been found to be useful as a coating flux on guide tubes in processes where such guide tubes are consumed; for example, see U.S. Patent No. 2,868,951 issued Jan. 13, 1959, to H. I. Shrubsall, wherein a consumable guide tube energizes and centers a welding wire in a joint and the flux coating on the guide tube replenishes the slag pool as welding progresses. The formulation of Composition A produces a highly conductive slag which minimizes arc outlays and facilitates the starting and stability of this process. Further, the composition allows even penetration of the base metals, thus providing weldments of good contour with uniform properties. Negligible undercutting is encountered and the fused slag is easily detached.

Composition B, like Composition A, produces a high conductivity slag. This composition contains no manganese and is, therefore, useful for such applications where manganese pick-up in the weld puddle is not desired. The manganese oxide is replaced by a very stable oxide—aluminum oxide. Other stable oxides could be used with substantially the same results. Potassium compounds such as potassium carbonate, potassium fluoride and potassium oxide are added as the arc stabilizes to make the welding operation quieter and smoother. Potassium could also be added in the form of feldspar which is mineral containing the oxides of potassium and sodium. Similar compounds of sodium or lithium could be used.

Composition C is like Composition B but has some manganese for those applications where some manganese pickup is desired. For example, this composition finds utility in Inconel cladding of carbon steel.

The compositions of this invention represent a great advance in fused submerged arc welding compositions. All present commercial grades of submerged arc contain considerable percentages of oxidizing components which will, under welding conditions, oxidize the weld metal. The compositions of the invention are composed essentially of non-oxidizing constituents so that any readily oxidizable elements in the welding wire which should be transferred to the weld may be so transferred without oxidation; thus providing for almost complete transfer of these elements from the wire to the weld.

As pointed out previously, the compositions of the invention are substantially free of silica. Substantially free of silica means that the composition usually has less than about 3 percent by weight silica as an impurity in the composition. While the inventive flux compositions are ideally suited for applications where silicon pickup in the weld would be harmful, it is recognized that there are applications where silicon pickup is not so critical. Accordingly, compositions can be made within the broad limits of the invention which are bonded with sodium or potassium silicate binders as is well known within the art. However, even in these situations it is desirable to keep the silica content as an impurity in the flux system.

What is claimed is:

1. A fused welding composition consisting essentially of from about 30 percent by weight up to about 65 percent by weight of at least one oxide taken from the class consisting of $Al_2O_3$, MgO, $TiO_2$, $ZrO_2$ and CaO and the balance being a fluorine bearing compound taken from the class consisting of calcium fluoride, sodium fluoride, magnesium fluoride, lithium fluoride, potassium fluoride and cryolite, said composition being substantially free of silica.

2. Composition according to claim 1 wherein the oxide is $Al_2O_3$.

3. Composition according to claim 1 wherein the oxide is $TiO_2$.

4. Composition according to claim 1 wherein the oxide is CaO.

5. Composition according to claim 1 wherein the oxide is MgO.

6. Composition according to claim 1 wherein the oxide is $ZrO_2$.

7. Composition according to claim 1 wherein the fluoride is $CaF_2$.

8. Composition according to claim 1 wherein the fluoride is $Na_3AlF_6$.

9. A fused welding composition consisting essentially of from about 0.0 to 5.0% by weight $Al_2O_3$; about 25.0 to 35.0% by weight $TiO_2$; about 1.0 to about 10.0% by weight MgO; about 1.0 to about 5.0% by weight CaO; about 1.0 to about 10.0% by weight $ZrO_2$; about 10.0 to about 30.0% by weight Mn Ore; about 20.0 to about 40.0% by weight $CaF_2$; about 1.0 to about 20.0% by weight $Na_3AlF_6$; said composition being substantially free of silica.

10. A fused welding composition consisting essentially of from about 5.0 to about 40.0% by weight $Al_2O_3$; about 5.0 to about 40.0% by weight $TiO_2$; about 0 to about 2.0% by weight Mn Ore; about 20.0 to about 70% by weight $CaF_2$; about 0 to about 5% by weight $Na_3AlF_6$; 0 to about 2.0% by weight potassium compounds, said composition being substantially free of silica.

11. A fused welding composition consisting essentially of from about 5.0 to about 40.0% by weight $Al_2O_3$; from about 5.0 to about 40.0% by weight $TiO_2$; from about 1 to about 20% by weight Mn Ore; from about 20 to about 40% by weight $CaF_2$; from about 1 to about 20.0% by weight $Na_3AlF_6$ and from about 0 to about 5.0% by weight potassium compounds, said composition being substantially free of silica.

12. A fused welding composition consisting essentially of about 27.00% $TiO_2$; 4.00% MgO; 2.00% CaO; 4.00% $ZrO_2$; 21.00% Mn Ore; 1.0% $SiO_2$; 32.00% $CaF_2$ and 9.00% cryolite, said composition being substantially free of silica.

13. A fused welding composition consisting essentially of about 35.0% $Al_2O_3$; 26.0% $TiO_2$; 37.0% $CaF_2$ and 2.0% potassium compounds, said composition being substantially free of silica.

14. A fused welding composition consisting essentially of about 28.0% $Al_2O_3$; 25.0% $TiO_2$; 5.0% Mn Ore; 35.0% $CaF_2$; 4.0% cryolite and 3.0% potassium compounds, said composition being substantially free of silica.

References Cited

FOREIGN PATENTS 860,071    2/1961    Great Britain.

HYLAND BIZOT, *Primary Examiner.*

WAYLAND W. STALLARD, *Assistant Examiner.*